S. CRISPIN.
Revolver.
No. 2,238. Reissued May 8, 1866.
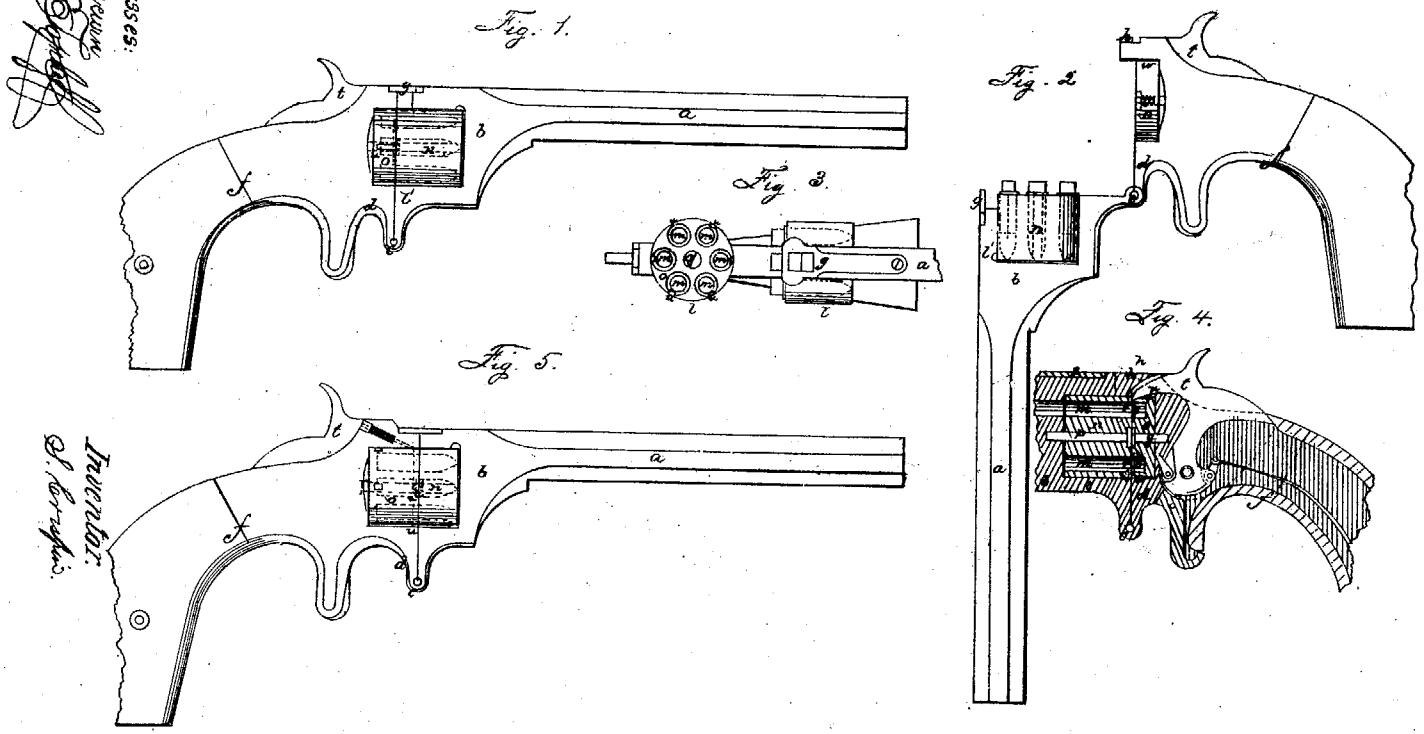
Witnesses:
Wm Freeman
C. L. Topliff
Inventor.
S. Crispin.
N. PETERS, PHOTO-LITHOGRAPHER, WASHINGTON, D. C.

UNITED STATES PATENT OFFICE.

SILAS CRISPIN, OF NEW YORK, N. Y.

IMPROVEMENT IN REVOLVING FIRE-ARMS.

Specification forming part of Letters Patent No. 50,224, dated October 3, 1865; Reissue No. 2,238, dated May 8, 1866.

*To all whom it may concern:*

Be it known that I, SILAS CRISPIN, of New York, in the county of New York and State of New York, have invented certain new and useful Improvements in Revolving Fire-Arms; and I do hereby declare the following to be a full, clear, and exact description thereof, reference being had to the accompanying drawings and the letters of reference marked thereon.

My invention relates to that class of fire-arms in which a rotating many-chambered cylinder is so arranged in the rear of a fixed barrel that the chambers of said cylinder may be brought in succession in line with the fixed barrel to be fired; and my invention has for its main objects to give to this class of fire-arms the advantages of the use of metallic cartridges, which can be entirely incased within the chambers of the cylinder, so as not to come in contact with the breech-plate of the arm, while at the same time the cartridges can be readily inserted or placed within the chambers and the empty cases extracted with great facility by hand, as I will hereinafter more fully explain; and to these ends, and with a view to give to the public a fire-arm of this class more desirable in many respects than any now known, my invention consists in making the many-chambered rotating cylinder in two parts, divided transversely through the chambers, and with grooves where the sections of the said chambers come together, in such a manner as to form annular recesses (when the two portions of the cylinder are brought together to incase the cartridge) to receive the fulminate-rim of a metallic cartridge having its fulminate-flange located between the front and rear end of the case, as will be hereinafter more fully set forth; and my invention also consists in sustaining the rotating cylinder at each end upon separate centers or base-pins, as and for purposes hereinafter set forth.

My invention further consists in hanging the two portions or sections of a many-chambered cylinder upon separate portions of the frame, hinged together in such manner that said cylinder-sections may be vibrated or swung toward and from each other upon a common center, as will be hereinafter set forth; and my invention further consists in confining each portion of the cylinder in the direction of its axis, or longitudinally upon its own base-pin, so that the two portions of the said cylinder will be retained in their proper relative positions with the barrel-frame and lock-frame when the latter are swung apart on their hinge, all as hereinafter more fully set forth.

To enable those skilled in the art to make and use my invention, I will proceed to describe the construction and operation of a fire-arm made according to my said invention, referring by letters to the accompanying drawings, in which—

Figure 1 is a side elevation of a fire-arm embodying my invention. Fig. 2 is a similar view of the same arm, but showing frame swung open and as if the cartridges were just placed in one portion of the cylinder, ready for the arm to be closed up, as seen at Fig. 1, for use. Fig. 3 is a view of the arm in the same condition illustrated at Fig. 2, but taken from a point of sight opposite the top of the barrel. Fig. 4 is a partial vertical longitudinal section; and Fig. 5 is a side elevation of an arm embodying my invention under a modification, which I will especially refer to hereinafter.

In the several parts the same letters of reference indicate the same part of the pistol.

*a a* in the drawings represent the barrel of the pistol, attached to or formed with its frame *b*, which is hung by a hinge-joint, *c*, to and upon the lower side, *d*, of the lock-frame *f*. Said frame *b* and lock-frame *f* are held together at their upper parts, when closed, by the interlocking of a spring-plate, *g*, of the barrel-frame with the square projecting piece *h* of the lock-frame.

*n* and *o* are the two portions or sections of the rotating breech-cylinder, having a series of chambers, *m m m*, extending nearly through its length, and of either the same size or larger than the bore of the barrel *a*. One of said sections, *n*, is secured longitudinally, but so as to freely turn, upon shaft *p* of the barrel-frame, and the other in like manner upon a stud, *q*, of the lock-frame, but both being upon the same plane, and so arranged that when brought together by the closing of the barrel-frame and lock-frame, as before described, and held in the proper positions on their axis by the cartridge-case or other means, as will be presently described, the contiguous ends of the sections shall perfectly coincide with each other, and their chambers constitute perfect cases to contain the cartridges and be brought in turn in line with the barrel (by the devices ordinarily employed for revolving the breech-cylinder) to be fired. In and between the two sections or parts of the breech-cylinder the metallic cartridges (represented by red lines in Figs. 1, 2, and 3 of the accompanying drawings) are inserted. They extend across from one section to the other, having their fulminating-rims held by and between the shoulder's recesses *e* and *s* of the contiguous ends of the chamber-sections. The cartridges, when brought in turn to and in the line of the barrel by means of the ordinary devices usually employed for revolving the breech-cylinder, are discharged by means of the hammer *t*, made of the proper shape and size to strike their fulminating-rims, the rear section, *o*, being either cut away at the proper points therefor, as seen in *u u*, or made of a sufficiently less diameter to leave a portion of the fulminate-rim of each cartridge exposed to be struck by the hammer.

From the above it is evident that as the metallic cartridges extend from one section to the other of the breech the two parts must necessarily revolve together and as one piece when the rear portion, *o*, only is actuated by any suitable driving mechanism; but, if deemed expedient, the sections *h* and *o* may be clutched together by dowel-pins inserted in one or both of them.

It is apparent that in order to insert the cartridges within the breech-cylinder its two parts must be opened from each other, as represented in Figs. 2 and 3, when the ball end of the cartridge is placed within the chamber of the front section, *n*, with the fulminating-rim resting upon the shoulders thereof, after which the rear section, *o*, of the cylinder is closed up, its chambers passing over and incasing the projecting rear ends of the metallic cases of the cartridges beyond the fulminating-rims. The parts are then locked together by the spring-plate *g*, before referred to, and the pistol is ready for use.

To remove the empty cartridge-cases it is only necessary to reopen the two parts of the cylinder into the positions before described for charging the chambers, when, by taking hold of the projecting portions of the empty cases, they can be easily and readily removed, as it is evident without further description.

It will be seen that in a fire-arm constructed according to my invention the metallic cartridge-cases are as completely enveloped or surrounded by the cylinder-sections when loaded as they would be if inserted through the muzzle into chambers bored part way through a solid cylinder, so that there cannot be any difficulty encountered by the expansion of the cartridge-case (in firing) against the stationary breech or any other portion of the arm, while at the same time the loading of the arm and the removal of the empty cases (without the aid of any extracting mechanism) may be effected with greater rapidity and facility than is possible with any other repeating-pistol with which I am familiar; and it will also be seen that with my improved fire-arm the severance or separation of the parts to admit of the ready insertion and extraction of the cartridge-cases does not induce to the complete detachment of the cylinder or any portion of it, or any other piece from the rest of the arm, and thus involve the possibility of a detached portion being dropped or misplaced; but, on the contrary, the several parts are all retained in such manner that they are always ready for use; and it will be observed that by my invention the several chambers of the cylinder may be conveniently loaded (and the empty cases extracted) by a person on horseback by opening the frame and laying the hinge over the bridle-arm, while the hand of the other arm is used to place the cartridges in their seats and close the hinged frame and bisected cylinder.

In Fig. 5 a modification of my improvement is represented, in which the breech-cylinder is divided nearer its front end, a corresponding change being made in the position of the fulminating-rim of the metallic cartridges, and an igniting-rod being employed within the upper portion of the lock-frame, arranged in such a manner that the striking force of the hammer of the pistol shall communicate through the said rod to the fulminating-rim of the cartridges, as plainly represented in the said figure.

Having explained the nature of my invention and the construction and operation of my improved fire-arm, what I claim as new, and desire to secure by Letters Patent, is—

1. In that class of fire-arms having a fixed barrel and many-chambered rotating and bisected cylinder, with the parts swinging on a hinge of the frame, forming the partial cartridge-chambers in each part of the cylinder, with annular recesses to accommodate the fulminate-flange of a cartridge, in combination with the means shown, or the equivalent, for allowing the said fulminate-flange of such cartridge to be exploded, as hereinbefore set forth.

2. In combination with a frame divided and hinged together as described, the employment of separate fixed centers or studs for the support of the revolving cylinder, one projecting forward from the rear and the other backward from the forward portion of said frame, as set forth.

3. The employment, in combination with a hinged frame, of the two cylinder-sections, the whole so constructed and arranged that the said cylinder-sections may be swung or vibrated on the hinge toward and from each other, substantially as and for the purposes set forth.

In testimony whereof I have hereunto set my hand and seal this 11th day of December, 1865.

SILAS CRISPIN. [L. S.]

In presence of—
J. N. McINTIRE,
ANDREW I. TODD.